(No Model.)

W. C. BECKWITH.
CARBON.

No. 290,836. Patented Dec. 25, 1883.

WITNESSES:
Thos. Houghton.
W. L. Stevens

INVENTOR:
W. C. Beckwith
BY Munn & Co
ATTORNEYS.

United States Patent Office.

WALTER C. BECKWITH, OF ALLEGHENY, PENNSYLVANIA.

CARBON.

SPECIFICATION forming part of Letters Patent No. 290,836, dated December 25, 1883.

Application filed March 26, 1883. (No model.)

*To all whom it may concern:*

Be it known that I, WALTER C. BECKWITH, a citizen of the United States, residing at Allegheny city, in the county of Allegheny and State of Pennsylvania, have invented a new and useful Carbon, of which the following is a specification.

My invention relates to that class of carbons used in electric lamps; and it has for its object to provide a carbon which may be wholly consumed, and a holder for holding the same.

To this end my invention consists in the construction and combination of parts hereinafter described and claimed, reference being had to the accompanying drawings, in which—

Figure 1:
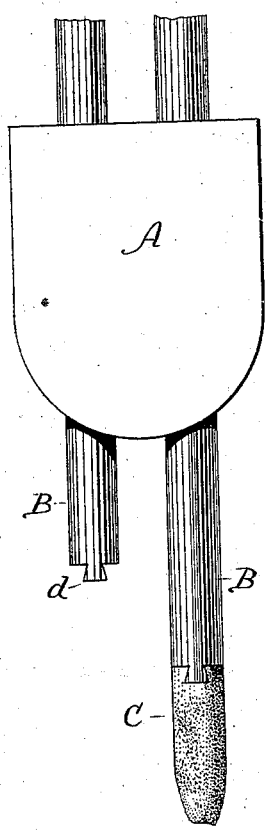
Figure 2:
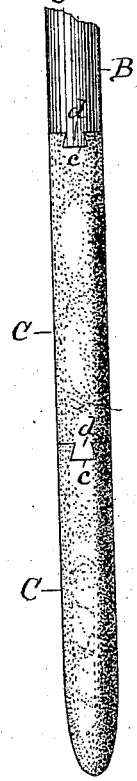

Figure 1 is a side elevation of a piece of one of my carbons and its holder, and Fig. 2 represents a whole carbon.

In order that the carbon-holder may not be required to follow the carbon so near the light as to endanger the holder, and in order that the carbons may be held pendent as well as standing, I shape the ends of the carbons to splice one upon another, so that the same may be burned right along over the splice. The ends to so splice may be dovetailed, as shown, or they may be of any other suitable form which requires the two parts to be put together sidewise, to join end to end and hold together in line without the necessary assistance of any sticking material, so that the carbons cannot be separated by being pulled endwise without breaking one of them. By a dovetail joint and other suitable form requiring to be put together sidewise, I mean a joint the two parts of which cannot be brought together into place endwise, but require to be, to some extent, laid alongside each other, in order that the tenon of one part may be inserted sidewise into the corresponding cross slot or mortise of the other to bring the two carbons in line when joined. There are many forms of joints known to carpentry which in form would answer this purpose; but no single timber, to my knowledge, is ever made, the two ends of which, if brought together, would fit each other, and no series of timbers are known to me having their ends interchangeably fitted to match together. On the contrary, it is the invariable custom to fit each timber to its mate. I show only a plain dovetail joint.

A represents the lamp or device for carrying the holders B. The holder B is shaped like one end of a carbon to receive the opposite end.

C represents the carbon. In Fig. 2 it will be seen that one end, $c$, of the carbon is shaped to receive another carbon shaped like its other end, $d$. The carbon-holder may be made to hold by either the projecting end $d$ or by the slotted end $c$. I prefer to make the carbon-holder B of corresponding size and shape to a carbon, that it may be readily inserted in the lamps now in use in the present carbon-holder.

If desired, any kind of gum may be used in connection with the spliced joint to assist in keeping the parts together; but when properly molded no such aid is needed. The ends may be electroplated, the same as the rest of its exterior, as now made.

What I claim as my invention, and wish to secure by Letters Patent, is—

1. Two carbons having dovetailed ends, adapted to engage each other sidewise, and to fit together in line when so joined, as shown and described.

2. The combination of two carbons having correspondingly-dovetailed slots and tenons adapted to engage each other, and thereby prevent separation of said carbons by longitudinal tension, substantially as described.

3. As a new article of manufacture, a carbon for electric-arc lights, having a dovetailed slot at one end and a corresponding tenon at the other, as and for the purpose specified.

4. The combination, with a carbon having dovetailed ends, of a carbon-holder having its body and one end shaped like the body and one end of said carbon, whereby the opposite end of the carbon may be held against longitudinal tension, as described.

WALTER C. BECKWITH.

Witnesses:
JOHN H. CRATTY,
JOHN F. ARMSTRONG.